(12) United States Patent
Xue et al.

(10) Patent No.: US 10,856,300 B2
(45) Date of Patent: Dec. 1, 2020

(54) PER-TTI RANK CONTROL WITHIN TRANSMISSION OPPORTUNITY FOR DOWNLINK COMP

(71) Applicant: QUALCOMM Incorporated, San Diego, CA (US)

(72) Inventors: Yisheng Xue, San Diego, CA (US); Weiliang Zeng, San Diego, CA (US); Siddhartha Mallik, San Diego, CA (US); Aleksandar Damnjanovic, Del Mar, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/121,162

(22) Filed: Sep. 4, 2018

(65) Prior Publication Data
US 2019/0116599 A1    Apr. 18, 2019

Related U.S. Application Data

(60) Provisional application No. 62/573,407, filed on Oct. 17, 2017.

(51) Int. Cl.
*H04W 72/06* (2009.01)
*H04W 72/04* (2009.01)
(Continued)

(52) U.S. Cl.
CPC ........... *H04W 72/06* (2013.01); *H04L 1/0002* (2013.01); *H04L 1/0026* (2013.01);
(Continued)

(58) Field of Classification Search
CPC ..... H04W 72/06; H04W 72/04; H04W 72/08; H04W 72/12; H04W 72/0446;
(Continued)

(56) References Cited

U.S. PATENT DOCUMENTS

| 2011/0299466 | A1 | 12/2011 | Ofuji et al. |
| 2013/0033989 | A1* | 2/2013 | Barbieri ................ H04L 1/0003 370/242 |

(Continued)

FOREIGN PATENT DOCUMENTS

WO    WO-2017016605 A1    2/2017

OTHER PUBLICATIONS

International Search Report and Written Opinion—PCT/US2018/049510—ISA/EPO—dated Nov. 20, 2018.

*Primary Examiner* — Kyaw Z Soe
(74) *Attorney, Agent, or Firm* — Liem T. Do

(57) ABSTRACT

A per-transmit time interval (TTI) rank control within a transmission opportunity (TxOP) is described for downlink coordinated multiple point (CoMP) operations. In operation, a base station may determine rank and data rate for communication during a transmission opportunity (TxOP) at the beginning of the TxOP. Each TxOP may include a plurality of transmission time intervals (TTIs). For each TTI of the TxOP, the base station computes one or more channel quality indicator (CQI) back-offs using one or more outer loop adaptation processes per TTI, and updates rank and the data rate using the CQI back-offs. Once updated, the base station transmits the downlink data during each TTI according to the updated rank and the data rate.

26 Claims, 7 Drawing Sheets

(51) Int. Cl.
*H04W 72/08* (2009.01)
*H04W 72/12* (2009.01)
*H04L 5/00* (2006.01)
*H04L 1/00* (2006.01)
*H04B 7/0417* (2017.01)
*H04W 74/08* (2009.01)

(52) U.S. Cl.
CPC .......... *H04L 1/0035* (2013.01); *H04L 5/0035* (2013.01); *H04W 72/0446* (2013.01); *H04W 72/082* (2013.01); *H04W 72/085* (2013.01); *H04W 72/1289* (2013.01); *H04B 7/0417* (2013.01); *H04L 1/0016* (2013.01); *H04W 74/08* (2013.01)

(58) Field of Classification Search
CPC ........... H04W 72/085; H04W 72/1289; H04W 72/082; H04L 5/00; H04L 1/0002; H04L 1/0026; H04L 1/0035; H04L 5/0035
See application file for complete search history.

(56) References Cited

U.S. PATENT DOCUMENTS

| | | | |
|---|---|---|---|
| 2013/0250924 A1* | 9/2013 | Chen | H04L 1/1819 370/336 |
| 2015/0049703 A1* | 2/2015 | Nobukiyo | H04L 1/203 370/329 |
| 2016/0037550 A1* | 2/2016 | Barabell | H04B 17/318 455/450 |

* cited by examiner

PER-TTI RANK CONTROL WITHIN TRANSMISSION OPPORTUNITY FOR DOWNLINK COMP

CROSS-REFERENCE TO RELATED APPLICATIONS

This application claims the benefit of U.S. Provisional Patent Application No. 62/573,407, entitled, "PER-TTI RANK CONTROL WITHIN TRANSMISSION OPPORTUNITY FOR DOWNLINK COMP," filed on Oct. 17, 2017, which is expressly incorporated by reference herein in its entirety.

BACKGROUND

Field

Aspects of the present disclosure relate generally to wireless communication systems, and more particularly, to per-transmit time interval (TTI) rank control within transmission opportunity (TxOP) for downlink coordinated multiple point (CoMP) operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes determining, by a base station at a beginning of a transmission opportunity, a rank and data rate for the transmission opportunity, wherein the transmission opportunity includes a plurality of transmission time intervals (TTIs), computing, by the base station, one or more channel quality indicator (CQI) back-offs for each TTI using one or more outer loop adaptation processes per TTI, and updating, by the base station, the rank and the data rate for each TTI using the one or more CQI back-offs, and transmitting, by the base station, data during each TTI of the plurality of TTIs according to the updated rank and the updated data rate.

In an additional aspect of the disclosure, an apparatus for wireless communication includes means for determining, by a base station at a beginning of a transmission opportunity, a rank and data rate for the transmission opportunity, wherein the transmission opportunity includes a plurality of TTIs, means for computing, by the base station, one or more CQI back-offs for each TTI using one or more outer loop adaptation processes per TTI, and means for updating, by the base station, the rank and the data rate for each TTI using the one or more CQI back-offs, and means for transmitting, by the base station, data during each TTI of the plurality of TTIs according to the updated rank and the updated data rate.

In an additional aspect of the disclosure, a non-transitory computer-readable medium having program code recorded thereon. The program code further includes code to determine, by a base station at a beginning of a transmission opportunity, a rank and data rate for the transmission opportunity, wherein the transmission opportunity includes a plurality of TTIs, code to compute, by the base station, one or more CQI back-offs for each TTI using one or more outer loop adaptation processes per and code to update, by the base station, the rank and the data rate for each TTI using the one or more CQI back-offs, and code to transmit, by the base station, data during each TTI of the plurality of TTIs according to the updated rank and the updated data rate.

In an additional aspect of the disclosure, an apparatus configured for wireless communication is disclosed. The apparatus includes at least one processor, and a memory coupled to the processor. The processor is configured to determine, by a base station at a beginning of a transmission opportunity, a rank and data rate for the transmission opportunity, wherein the transmission opportunity includes a plurality of TTI, to compute, by the base station, one or more CQI back-offs for each TTI using one or more outer loop adaptation processes per TTI, and to update, by the base station, the rank and the data rate for each TTI using the one or more CQI back-offs, and to transmit, by the base station, data during each TTI of the plurality of TTIs according to the updated rank and the updated data rate.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
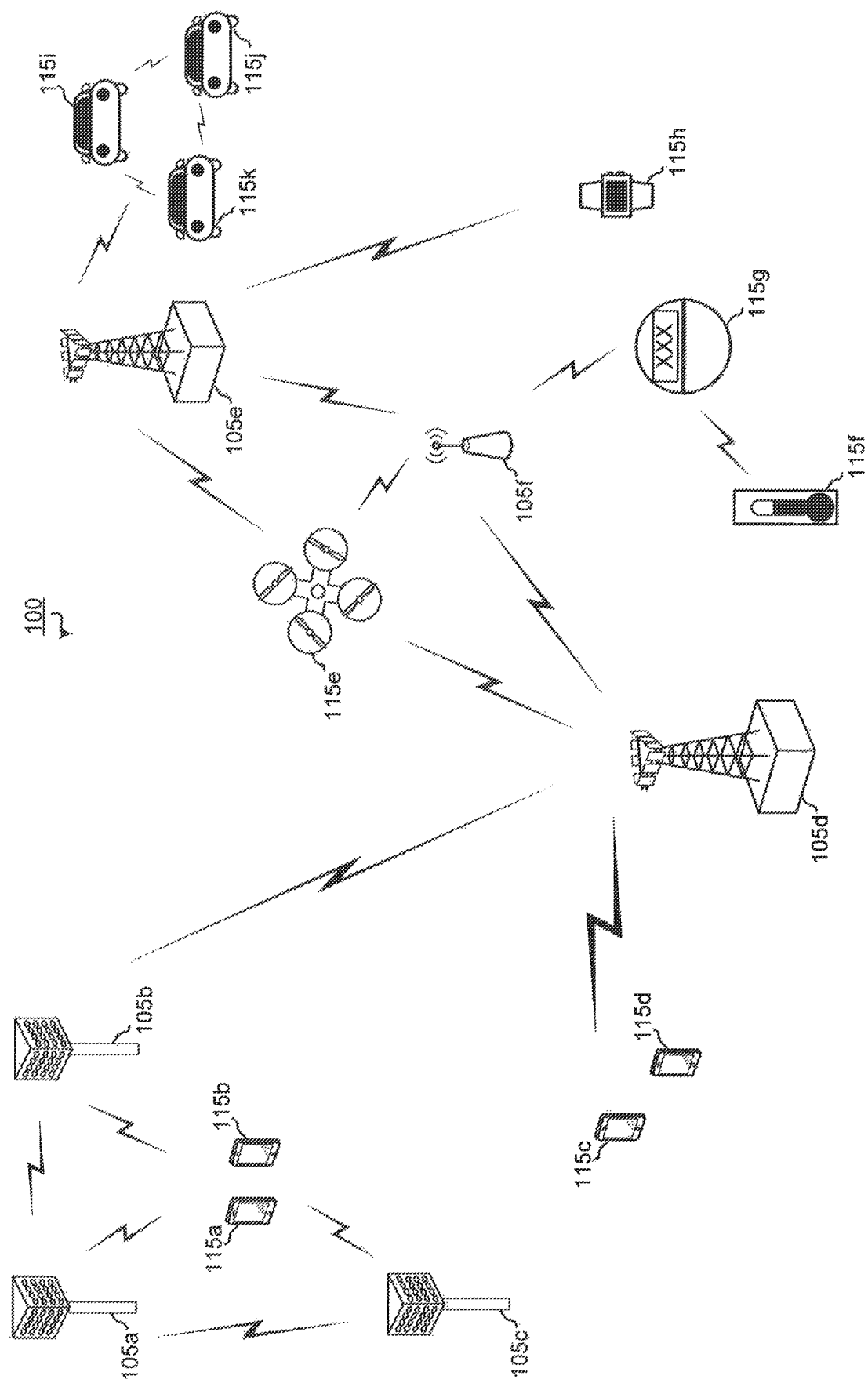
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115*a*-115*d* are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115*e*-115*k* are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105*a*-105*c* serve UEs 115*a* and 115*b* using 3D beamforming and coordinated spatial techniques, such as coordinated multi-point (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
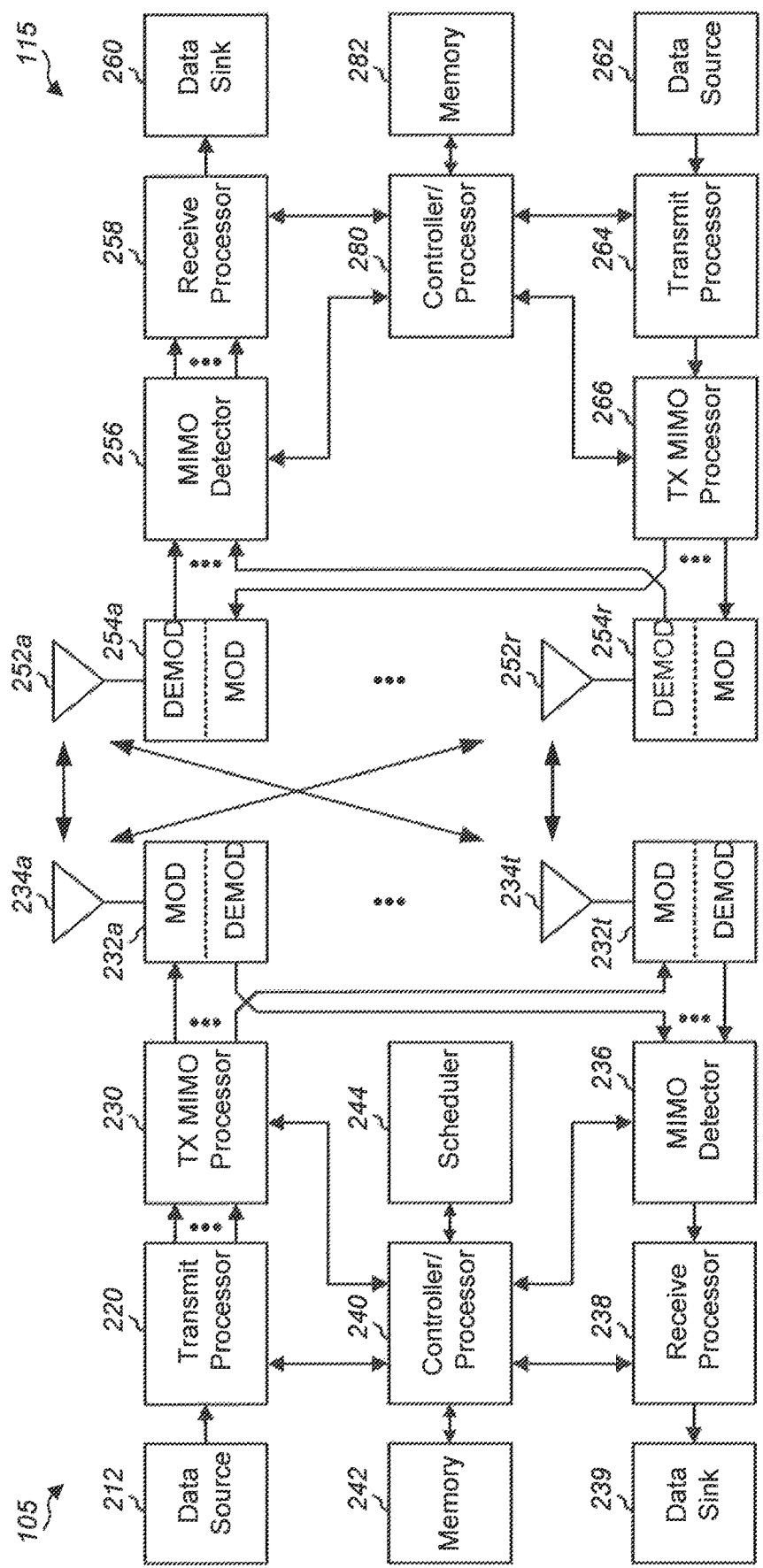
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODS) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols, A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 5, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
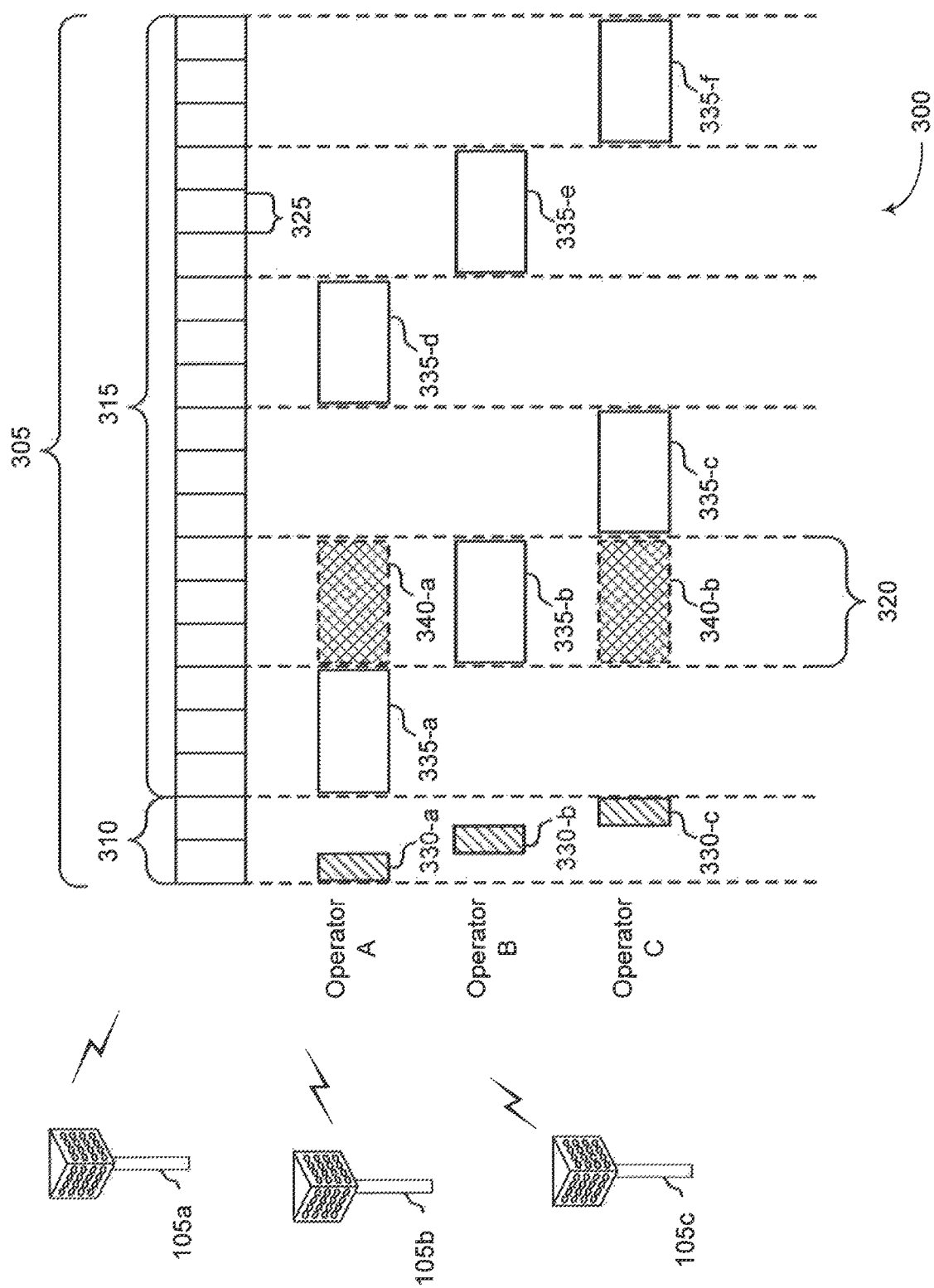
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-h) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-NT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

In synchronous NR-SS systems, a set of base stations located within a certain radius may be referred to as a cluster, regardless of whether all of the base stations in the cluster are from the same network operator. The base stations in one cluster may be far enough from other base stations included in other clusters. Within a cluster, multiple base stations or access points from the same network operator may be grouped into cooperation sets for coordinated multipoint (CoMP) operations. Cross-cell interference may be avoided in CoMP deployments through various downlink and uplink techniques, such as zero-forcing block diagonal (ZFBD) transmission beamforming (TxBF) on the downlink or/and joint linear minimum mean square error (LMMSE) transceiver design on the uplink. In each cluster, the transmitting nodes from the secondary network operator may generally use the shared channel when the priority network operator nodes are idle, sensed through over-the-air (OTA) signals.

Figure 4:
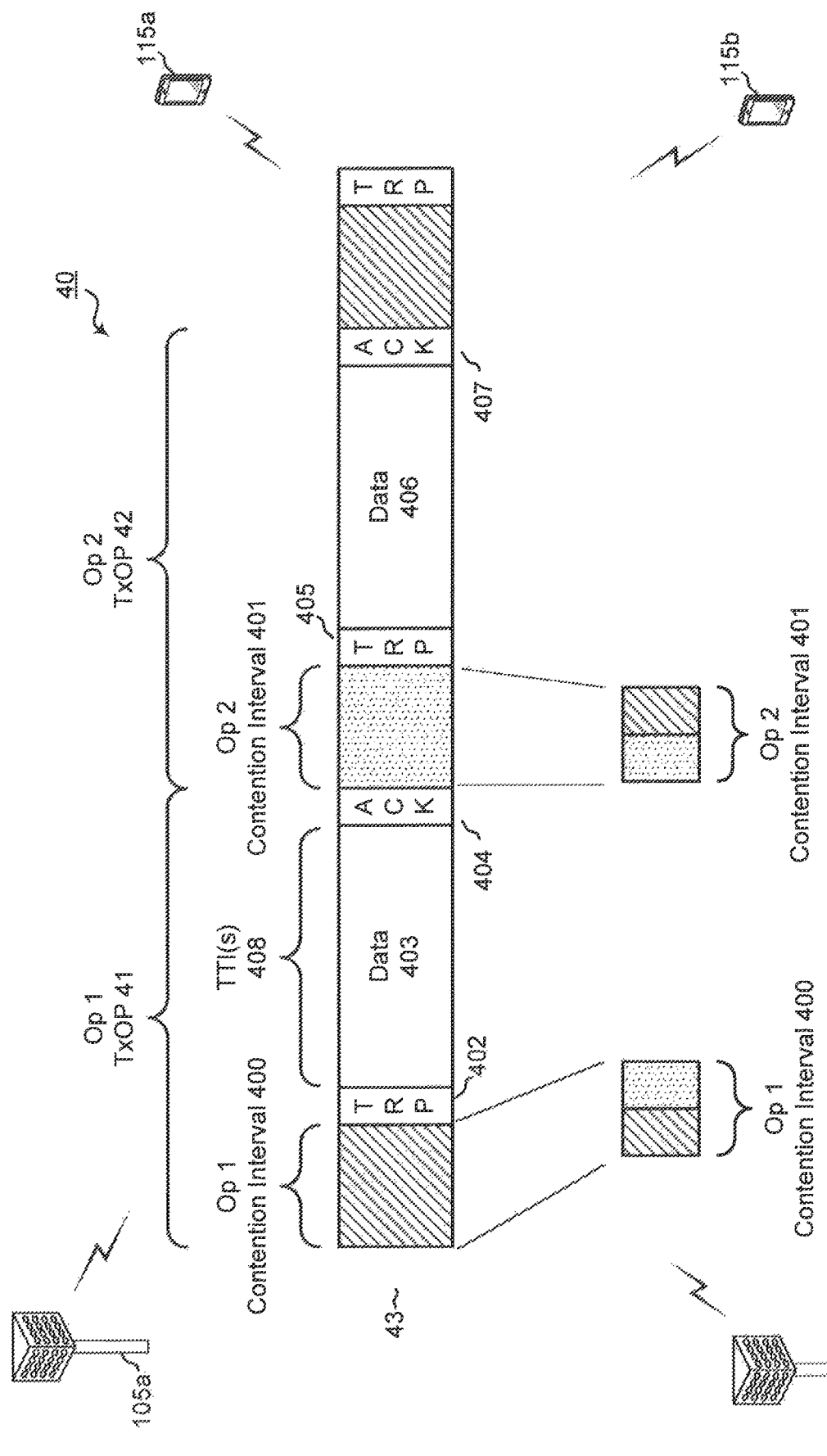
FIG. 4 is a block diagram illustrating an NR-SS system.

FIG. 4 is a block diagram illustrating a NR-SS system 40. Base station 105a and UE 115a from a first network operator (Op 1) and base station 105b and UE 115b from a second network operator (Op 2) communicate using shared communication channel 43. Communications in NR-SS systems may be configured with self-contained transmission opportunities that includes a contention region for securing access to shared communication channel 43, a training phase for determining the optimum transmission parameters for shared communication channel 43, a downlink portion, which may include one or more separate transmission time intervals (TTIs) and an uplink portion. For example, TxOP 41, which prioritizes Op 1, includes contention interval 400. If base station 105a or UE 115a have transmissions to make, channel reservations signaling will be exchanged during this period. Base station 105b or UE 115b would not be able to transmit on TxOP 41 unless base station 105a/UE 115a did not attempt to reserve the shared channel.

Once shared communication channel 43 is reserved, training phase 402 provides an opportunity for base station 105a/UE 115a and neighboring transmitter-receiver pairs to determines the transmission parameters to minimize interference. As illustrated, at 403, downlink data is transmitted from base station 105a to UE 115a. The downlink data may be transmitted via one or more TTIs 408 within 403. At the end of TxOP 41, uplink portion 404 allows for UE 115a to transmit block acknowledgement signaling for each of the downlink transmissions. Block acknowledgement signaling is the baseline feature for maintaining low overhead, such as by reducing the amount of switching between downlink and uplink, at the like. As a consequence, the transmission parameters, such as TxBF, rank, and modulation and coding scheme (MCS) are determined at training phase 402 and used throughout TxOP 41. Downlink orthogonal TxBFs are computed based on the channel state information (CSI) available at that instant. Considering a standard LAA scenario with a 3 kmph UE mobility, any TxBF orthogonality computed at the beginning of TxOP 41 would likely be destroyed before the end of TxOP 41. Moreover, the leakage from concurrent data streams can result in significantly degraded signal-to-interference-plus noise ratio (SINR) in latter TTIs of a TxOP.

A similar situation may be present for TxOP 42, with communications between base station 105b and UE 115b. After reserving shared communication channel 43 during contention interval 401 and computing transmission parameters during training phase 405, the orthogonality of TxBF and SINR will be degraded during the downlink transmissions of 406 without the available adjustments that may be made after receiving new acknowledgement signaling and CSI during uplink portion 407.

One solution that has been suggested is to have a per-TTI MCS throughout the TxOP. For example, parallel or independent channel quality indicator (CQI) outer-loop adaptations (OLAs) are adaptation processes or procedures maintained by a base station, such as base station 105a, for each respective one of TTIs 408 in TxOP 41. An OLA process uses acknowledgement information from a served UE, such as UE 115a, for received data to determine a more practical CQI value than the CQI value that may be determined directly from signal/channel measurements by UE 115a. The OLA will produce a back-off value that may be applied to the originally-determined CQI for adjusting to the actual channel conditions (referred to herein as a CQI back-off).

After obtaining rank using the orthogonal TxBFs at training phase 402, CQI back-offs for each TTI, as determined from the OLAs, may be applied to revise the MCS for that particular TTI. In operation, a later TTI of TTIs 408 may have a smaller MCS (assuming that the OLAs are running at the same block error rate (BLER) target).

While adjustments for a per-TTI MCS improve performance, transmission may still be sub-optimal due to the constant rank maintained throughout the TxOP. Various aspects of the present disclosure are directed to determining per-TTI rank in additional to the per-TTI MCS within a given TxOP. Considering the non-orthogonal "leakage" in later TTIs, a smaller rank for a later TTI may intuitively result in more beneficial transmission performance, especially when loss of orthogonality is considered. Per-TTI rank may result in more spatial degrees of freedom (DoFs) for interference suppression at the desired receiver, as well as fewer interfering data streams to any victim nodes.

Figure 5:
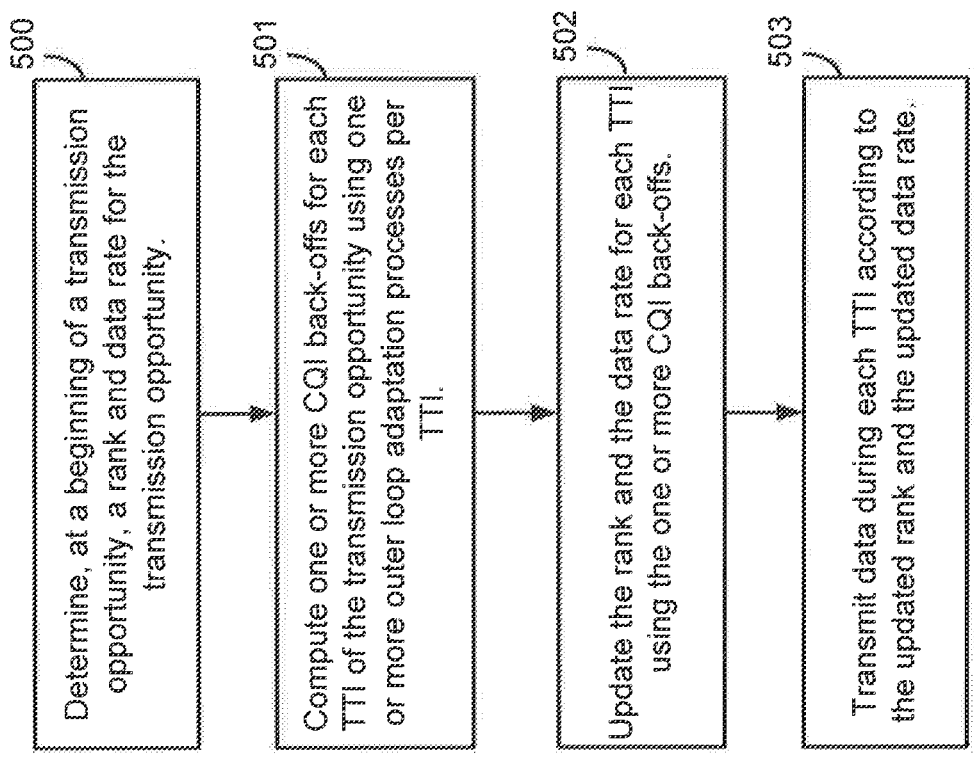
FIG. 5 is a block diagram illustrating example blocks executed to implement one aspect of the present disclosure.
Figure 7:
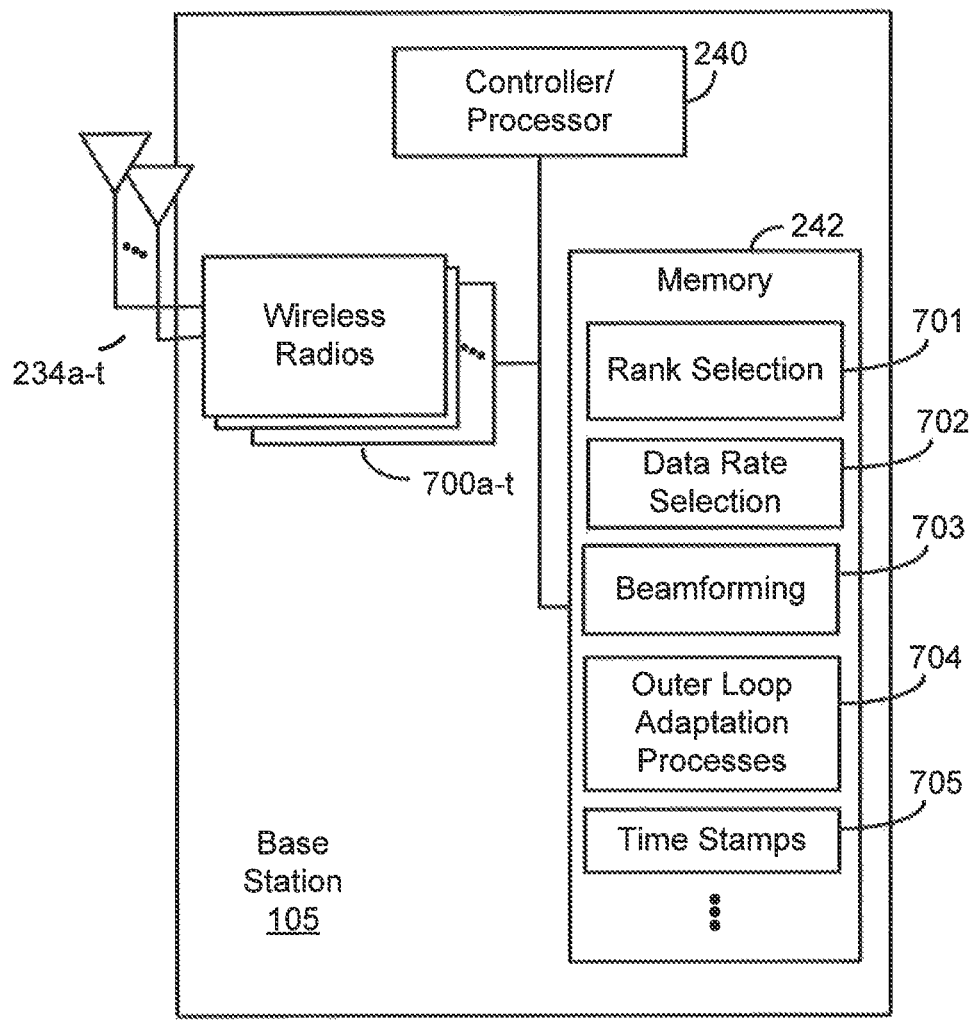
FIG. 7 is a block diagram illustrating a base station configured according to aspects of the present disclosure.

FIG. 5 is a block diagram illustrating example blocks executed to implement one aspect of the present disclosure. The example blocks will also be described with respect to base station 105 as illustrated in FIG. 7. FIG. 7 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 700a-t and antennas 234a-t. Wireless radios 700a-t includes various components and hardware, as illustrated in FIG. 2 for base station 105, including modulator/demodulators 232a-t, MIMO detector 236, receive processor 238, transmit processor 220, and TX MIMO processor 230.

At block 500, a base station determines, at a beginning of a transmission opportunity, rank and data rate for the transmission opportunity. After reserving access to the shared communication channel, a base station, such as base station 105, preparing for downlink communications determines the transmission parameters for the TxOP, such as TxBF, rank, and data rate (e.g., MCS). Base station 105, under control of controller/processor 240, executes rank selection logic 701, data rate selection logic 702, and beamforming logic 703, stored in memory 242. The execution environments of these transmission parameter logics provides the functionality for base station 105 to determine the rank, MCS, and TxBF for the transmissions expected during the TxOP. Base station 105 may determine one or multiples sets of such transmission parameters for the communications with various numbers of UEs. These transmission parameters are based on the current measurements and any feedback from the served UEs, including CSI feedback, current acknowledgement information available to the base station, and the like.

At block 501, the base station computes one or more CQI back-offs for each of the transmission opportunity using one or more outer loop adaptation processes per TTI. Base station 105 runs multiple outer loop adaptation processes 704 in memory 242. Each of outer loop adaptation processes 704 uses acknowledgement information to determine the more practical or accurate channel quality. While the channel quality identified in CSI feedback from the UE bases the quality on channel measurements, such as SNR, SINR, and the like, the channel quality adaptations of the CQI back-offs, use the actual performance information, via the acknowledgement information, to refine the representation of channel quality. Base station 105 selects the particular one of the outer loop adaptation processes 704 to obtain the CQI back-offs for computing the backed-off effective SINR for each TTI. As will be described in greater detail below, base station 105 will select the particular one of the outer loop adaptation processes 704 that have a threshold number of timely updates.

According to various aspects of the present disclosure, the base station maintains one or more OLAs per TTI of the TxOP. For example, the base station may maintain one OLA process for each TTI, an OLA process for each available rank of each TTI, an OLA process for each number of UEs simultaneously scheduled for the downlink by the current CoMP cluster, and another OLA process for a combination of available rank and number of UEs scheduled. Each one of these OLAs maintained may have different levels of detail as to the back-off condition of the TxOP.

At block 502, the base station updates rank and data rate for each TTI using the one or more CQI back-offs. In one example of operation, base station 105, under control of controller/processor 240, calculates an effective SINR assuming perfect TxBF-based nulling for each respective available rank. For the i-th TTI, base station 105 then computes a backed-off effective SINR for each available rank by subtracting corresponding CQI back-off values obtained from outer loop adaptation processes 704 from the first-calculated effective SINR of the TxOP. Base station 105, within the execution environment of rank selection logic 701, determines the optimum rank for the i-th TTI as the rank that results in the largest estimated throughput predicted using the backed-off effective SINR calculated at block 501.

At block 503, the base station transmits data during each TTI according to the updated rank and the updated data rate. With both the rank and MCS optimally updated for the TTI, base station 105 will transmit the downlink data according to the updated optimal parameters via wireless radios 700*a-t* and antennas 234*a-t*.

Figure 6:
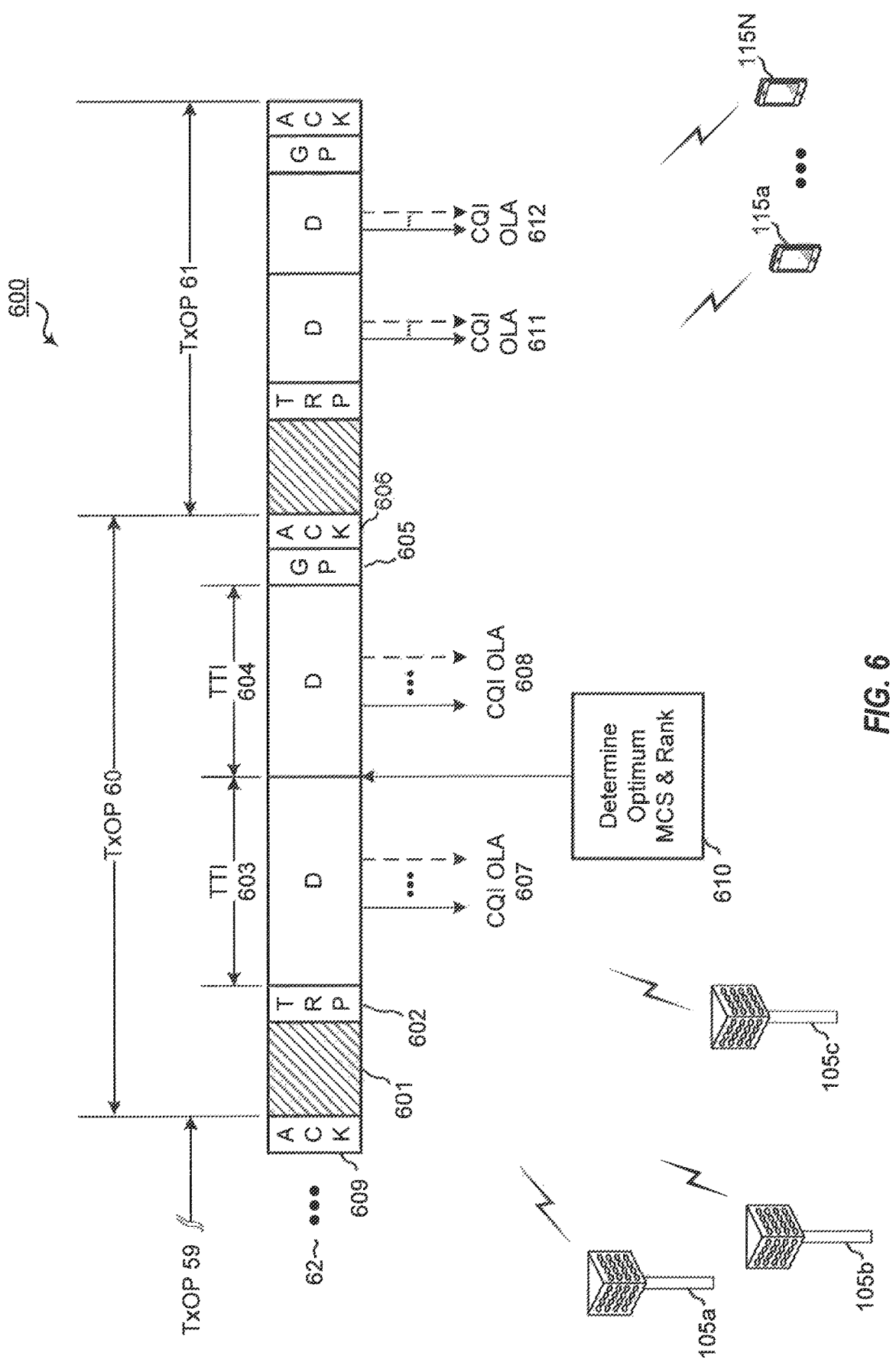
FIG. 6 is a block diagram illustrating an NR-SS system configured according to one aspect of the present disclosure.

FIG. 6 is a block diagram illustrating NR-SS system 600 configured according to one aspect of the present disclosure. Within the illustrated portion of NR-SS system 600, base stations 105*a*-105*c*, from the same network operator, are joined in a CoMP cooperation set. At any given time, base stations 105*a*-105*c* may provide communications with any number of UEs, such as UEs 115*a*-115N. Base stations 105*a*-105*c* and UEs 115*a*-115N communicate using a shared communication channel 62. Shared communication channel 62 may be divided into multiple TxOPs (e.g., TxOPs 59-61) during which one or more of base stations 105*a*-105*c* may have priority access, as determined by the network.

As noted above, at the beginning of a TxOP, such as TxOP 60, access is reserved in contention interval 601 with the transmission parameters determined during training phase 602. Each TxOP may include multiple TTIs for transmissions. As illustrated, TxOP 60 includes TTI 603 and 604. The UE communicating with the transmitting base station is able to transmit on uplink portion 606 after guard period 605 to allow for switching between downlink and uplink operations. The communicating UE will provide block acknowledgement signaling during uplink portion 606.

As a part of its communications procedures, the communicating base station of base stations 105*a*-105*c*, maintain multiple outer loop adaptation (OLA) processes, CQI OLA 607 and 608. In one example implementation, base station 105*a* may maintain a CQI OLA per TTI, a CQI OLA per available rank per TTI, a CQI OLA per UE scheduled for simultaneous communication within the CoMP group and per TTI, and a CQI OLA per a combination of available rank and UE scheduled per TTI. Therefore, CQI OLA 607, 608, 611, and 612 represent multiple CQI OLA processes maintained in parallel by each communicating base station.

In order to maintain each CQI OLA process, a base station uses acknowledgement signaling that it receives to update the CQI OLA. For each acknowledgement signal received, the base station, such as base station 105 (FIG. 7), stores the time stamp of the acknowledgement signal in memory 242 at time stamps 705. Time stamps 702 may be a fixed-size or circular array in memory 242 that maintains a certain number of time stamps at any given time. When base station 105 wins the shared communication channel for communications regularly, there is a higher probability that the CQI OLA are updated often with acknowledgement information that is received regularly from the served UEs. In such a scenario, time stamps 705 saved in memory 242 will likely be close in time, as the communication has occurred on a regular basis. In contrast, when base station 105 does not participated in communications regularly, the time stamps stored in time stamps 705 may originate during various different time periods, based on the more irregular communications. Thus, the oldest time stamp in such a scenario is likely older than the oldest time stamp in the previous scenario where base station 105 participates in communications more regularly.

Multiple CQI OLAs may also be updated simultaneously with each set of acknowledgement signaling received. For example, at uplink portion 609, base station 105*a* obtains acknowledgement information for the $2^{nd}$ TTI for rank 2 together with two simultaneous UEs. Base station 105*a* may then update not only the CQI OLA for the $2^{nd}$ TTI for rank 2 with two simultaneous UEs, but also update the less relevant CQI OLAs having at least some of the same TTI characteristics as the incoming acknowledgement information. For example, with the acknowledgement information received for the $2^{nd}$ TTI at rank 2 with two simultaneous UEs, the base station may also update the CQI OLA for the $2^{nd}$ TTI with rank 2, and the CQI OLA for the $2^{nd}$ TTL.

In one operational example, when base station 105*c* successfully reserves shared communication. Channel 62 during TxOP 61, base station 105*c* will access CQI OLA 611 and 612 in order to obtain CQI back-off to update optimum rank and MCS for each TTI. However, base station 105*c* will select the most relevant timely CQI OLA process for determining the optimum rank and MCS. The relevance of a CQI OLA may depend on the characteristics of the TTI for which the updates are being determined. If, in such a TTI, the rank is 2 and there are three simultaneously scheduled UEs, those characteristics would identify the CQI OLA for the specific TTI with rank 2 and three simultaneously scheduled UEs as being the most relevant CQI OLA Additionally, a CQI OLA process will be considered timely when the oldest time stamp stored by the base station associated with that particular CQI OLA is within a predetermined threshold time window from the current time—the current time being when base station 105*c* attempting to update the transmission parameters (e.g., rank, data rate/MCS, etc.) after reserving shared communication channel 62 during TxOP 61.

Thus, base station 105c will access CQI OLA 611 in order to obtain the CQI back-off for the $2^{nd}$ TTI, which operates at rank 2 with two simultaneously scheduled UEs, UEs 115a and 115N. Base station 105c will first attempt to obtain the CQI back-off from the CQI OLA for the $2^{nd}$ TTI at rank 2 with two UEs. However, after checking the oldest time stamp stored in memory for this CQI OLA, base station 105c determines that it is outside of the predetermined threshold time window. Accordingly, base station 105c would determine this CQI OLA to be untimely. Base station 105c would next check the oldest time stamp for the CQI OLA for the $2^{nd}$ TTI at rank 2. For purposes of the described example, this oldest time falls within the predetermined threshold time from the current time. Therefore, base station 105c selects the CQI back-off for the CQI OLA for the $2^{nd}$ TTI at rank 2 and updates rank and MCS for the $2^{nd}$ TTI. Base station 105c would then begin downlink data transmissions for the $2^{nd}$ TTI to UEs 115a and 115N using the optimum rank and MCS.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 5 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, by a base station at a beginning of a transmission opportunity, a rank and data rate for the transmission opportunity, wherein the transmission opportunity includes a plurality of transmission time intervals (TTIs);
   for each TTI of the plurality of TTIs:
   computing, by the base station, one or more channel quality indicator (CQI) back-offs using one or more outer loop adaptation processes per TTI; and
   updating, by the base station, the rank and the data rate using the one or more CQI back-offs; and
   transmitting, by the base station, data during each TTI of the plurality of TTIs according to the updated rank and the updated data rate,
   wherein updating the rank includes:
   calculating an effective signal-to-interference-plus-noise ratio (SINR) for a plurality of available ranks at an associated TTI of the plurality of TTIs;
   adjusting the effective SINR with the one or more CQI back-offs of the associated TTI;
   estimating a throughput associated with each of the plurality of available ranks based on the adjusted effective SINR; and
   selecting the updated rank of the plurality of available ranks, wherein the updated rank has a highest value of the estimated throughput.

2. The method of claim 1, wherein the one or more outer loop adaptation processes are associated with one or more characteristics of each TTI, the one or more outer loop adaptation processes including one or more of:
   an outer loop adaptation process per TTI
   an outer loop adaptation process per available rank per TTI;
   an outer loop adaptation process per number of user equipments (UEs) scheduled for downlink per TTI; and
   an outer loop adaptation process per available rank, per number of UEs scheduled for downlink, and per TTI.

3. The method of claim 2, further including:
   updating, by the base station, the one or more outer loop adaptation processes based on acknowledgement information associated with one or more of the one or more outer loop adaptation processes; and
   maintaining, by the base station, a sliding window of time stamps of the acknowledgement information for each of the one or more outer loop adaptation processes.

4. The method of claim 3,
   wherein the acknowledgement information relates to one of the one or more outer loop adaptation processes having a set of characteristics of the one or more characteristics;
   wherein the updating the one or more outer loop adaptation processes includes updating each of the one or more outer loop adaptation processes having at least one characteristic of the set of characteristics associated with the one of the one or more outer loop adaptation processes.

5. The method of claim 3, further including:
   selecting, by the base station, one or more timely outer loop adaptation processes from the one or more outer loop adaptation processes, wherein the one or more timely outer loop adaptation processes have a number of timely updates exceeding a threshold minimum number of timely updates;
   identifying, by the base station, the one or more characteristics associated with the each TTI, wherein the computing the one or more CQI back-offs includes:
   computing the one or more CQI back-offs using a timely outer loop adaptation process of the one or more timely outer loop adaptation processes having a highest number of characteristics of the one or more characteristics associated with the each TTI.

6. The method of claim 5, wherein the selecting the one or more timely outer loop adaptation processes includes:
   comparing, by the base station, a current time of the selecting the one or more timely outer loop adaptation processes with an oldest time stamp of the sliding window of time stamps for each of the one or more outer loop adaptation processes; and
   determining, by the base station, the one or more timely outer loop adaptation processes when the current time is within a predetermined time of the oldest time stamp.

7. The method of claim 1, wherein the base station is one of a plurality of base stations in a coordinated multipoint (CoMP) cooperation set.

8. An apparatus configured for wireless communication, comprising:
   means for determining, by a base station at a beginning of a transmission opportunity, a rank and data rate for the transmission opportunity, wherein the transmission opportunity includes a plurality of transmission time intervals (TTIs);
   for each TTI of the plurality of TTIs:
   means for computing, by the base station, one or more channel quality indicator (CQI) back-offs using one or more outer loop adaptation processes per TTI; and
   means for updating, by the base station, the rank and the data rate using the one or more CQI back-offs; and
   means for transmitting, by the base station, data during each TTI of the plurality of TTIs according to the updated rank and the updated data rate,
   wherein the means for updating the rank includes:
   means for calculating an effective signal-to-interference-plus-noise ratio (SINR) for a plurality of available ranks at an associated TTI of the plurality of TTIs;
   means for adjusting the effective SINR with the one or more CQI back-offs of the associated TTI;
   means for estimating a throughput associated with each of the plurality of available ranks based on the adjusted effective SINRK; and
   means for selecting the updated rank of the plurality of available ranks, wherein the updated rank has a highest value of the estimated throughput.

9. The apparatus of claim 8, wherein the one or more outer loop adaptation processes are associated with one or more characteristics of each TTI, the one or more outer loop adaptation processes including one or more of:
   an outer loop adaptation process per TTI
   an outer loop adaptation process per available rank per TTI;
   an outer loop adaptation process per number of user equipments (UEs) scheduled for downlink per TTI; and
   an outer loop adaptation process per available rank, per number of UEs scheduled for downlink, and per TTI.

10. The apparatus of claim 9, further including:
means for updating, by the base station, the one or more outer loop adaptation processes based on acknowledgement information associated with one or more of the one or more outer loop adaptation processes; and
means for maintaining, by the base station, a sliding window of time stamps of the acknowledgement information for each of the one or more outer loop adaptation processes.

11. The apparatus of claim 10,
wherein the acknowledgement information relates to one of the one or more outer loop adaptation processes having a set of characteristics of the one or more characteristics;
wherein the means for updating the one or more outer loop adaptation processes includes means for updating each of the one or more outer loop adaptation processes having at least one characteristic of the set of characteristics associated with the one of the one or more outer loop adaptation processes.

12. The apparatus of claim 10, further including:
means for selecting, by the base station, one or more timely outer loop adaptation processes from the one or more outer loop adaptation processes, wherein the one or more timely outer loop adaptation processes have a number of timely updates exceeding a threshold minimum number of timely updates;
means for identifying, by the base station, the one or more characteristics associated with the each TTI, wherein the means for computing the one or more CQI back-offs includes:
means for computing the one or more CQI back-offs using a timely outer loop adaptation process of the one or more timely outer loop adaptation processes having a highest number of characteristics of the one or more characteristics associated with the each TTI.

13. The apparatus of claim 12, wherein the means for selecting the one or more timely outer loop adaptation processes includes:
means for comparing, by the base station, a current time of the selecting the one or more timely outer loop adaptation processes with an oldest time stamp of the sliding window of time stamps for each of the one or more outer loop adaptation processes; and
means for determining, by the base station, the one or more timely outer loop adaptation processes when the current time is within a predetermined time of the oldest time stamp.

14. The apparatus of claim 8, wherein the base station is one of a plurality of base stations in a coordinated multipoint (CoMP) cooperation set.

15. A non-transitory computer-readable medium having program code recorded thereon, the program code comprising:
program code executable by a computer for causing the computer to determine, by a base station at a beginning of a transmission opportunity, a rank and data rate for the transmission opportunity, wherein the transmission opportunity includes a plurality of transmission time intervals (TTIs);
program code executable by the computer, for each TTI of the plurality of TTIs:
for causing the computer to compute, by the base station, one or more channel quality indicator (CQI) back-offs using one or more outer loop adaptation processes per TTI; and
for causing the computer to update, by the base station, the rank and the data rate using the one or more CQI back-offs; and
program code executable by the computer for causing the computer to transmit, by the base station, data during each TTI of the plurality of TTIs according to the updated rank and the updated data rate,
wherein the program code executable by the computer for causing the computer to update the rank includes:
program code executable by the computer for causing the computer to calculate an effective signal-to-interference-plus-noise ratio (SINR) for a plurality of available ranks at an associated TTI of the plurality of TTIs;
program code executable by the computer for causing the computer to adjust the effective SINR with the one or more CQI back-offs of the associated TTI;
program code executable by the computer for causing the computer to estimate a throughput associated with each of the plurality of available ranks based on the adjusted effective SINR; and
program code executable by the computer for causing the computer to select the updated rank of the plurality of available ranks, wherein the updated rank has a highest value of the estimated throughput.

16. The non-transitory computer-readable medium of claim 15, wherein the one or more outer loop adaptation processes are associated with one or more characteristics of each TTI, the one or more outer loop adaptation processes including one or more of:
an outer loop adaptation process per TTI
an outer loop adaptation process per available rank per TTI;
an outer loop adaptation process per number of user equipments (UEs) scheduled for downlink per TTI; and
an outer loop adaptation process per available rank, per number of UEs scheduled for downlink, and per TTI.

17. The non-transitory computer-readable medium of claim 16, further including:
program code executable by the computer for causing the computer to update, by the base station, the one or more outer loop adaptation processes based on acknowledgement information associated with one or more of the one or more outer loop adaptation processes; and
program code executable by the computer for causing the computer to maintain, by the base station, a sliding window of time stamps of the acknowledgement information for each of the one or more outer loop adaptation processes.

18. The non-transitory computer-readable medium of claim 17,
wherein the acknowledgement information relates to one of the one or more outer loop adaptation processes having a set of characteristics of the one or more characteristics;
wherein the program code executable by the computer for causing the computer to update the one or more outer loop adaptation processes includes program code executable by the computer for causing the computer to update each of the one or more outer loop adaptation processes having at least one characteristic of the set of characteristics associated with the one of the one or more outer loop adaptation processes.

19. The non-transitory computer-readable medium of claim 17, further including:
program code executable by the computer for causing the computer to select, by the base station, one or more timely outer loop adaptation processes from the one or more outer loop adaptation processes, wherein the one or more timely outer loop adaptation processes have a number of timely updates exceeding a threshold minimum number of timely updates;

program code executable by the computer for causing the computer to identify, by the base station, the one or more characteristics associated with the each TTI, wherein the program code executable by the computer for causing the computer to compute the one or more CQI back-offs includes:

program code executable by the computer for causing the computer to compute the one or more CQI back-offs using a timely outer loop adaptation process of the one or more timely outer loop adaptation processes having a highest number of characteristics of the one or more characteristics associated with the each TTI.

20. An apparatus configured for wireless communication, the apparatus comprising:
at least one processor; and
a memory coupled to the at least one processor,
wherein the at least one processor is configured:
  to determine, by a base station at a beginning of a transmission opportunity, a rank and data rate for the transmission opportunity, wherein the transmission opportunity includes a plurality of transmission time intervals (TTIs);
  for each TTI of the plurality of TTIs:
    to compute, by the base station, one or more channel quality indicator (CQI) back-offs using one or more outer loop adaptation processes per TTI; and
    to update, by the base station, the rank and the data rate using the one or more CQI back-offs; and
  to transmit, by the base station, data during each TTI of the plurality of TTIs according to the updated rank and the updated data rate,
wherein the configuration of the at least one processor to update the rank includes configuration of the at least one processor:
  to calculate an effective signal-to-interference-plus-noise ratio (SINR) for a plurality of available ranks at an associated TTI of the plurality of TTIs;
  to adjust the effective SINR with the one or more CQI back-offs of the associated TTI;
  to estimate a throughput associated with each of the plurality of available ranks based on the adjusted effective SINR; and
  to select the updated rank of the plurality of available ranks, wherein the updated rank has a highest value of the estimated throughput.

21. The apparatus of claim 20, wherein the one or more outer loop adaptation processes are associated with one or more characteristics of each TTI, the one or more outer loop adaptation processes including one or more of:
an outer loop adaptation process per TTI
an outer loop adaptation process per available rank per TTI;
an outer loop adaptation process per number of user equipments (UEs) scheduled for downlink per TTI; and
an outer loop adaptation process per available rank, per number of UEs scheduled for downlink, and per TTI.

22. The apparatus of claim 21, further including configuration of the at least one processor:
  to update, by the base station, the one or more outer loop adaptation processes based on acknowledgement information associated with one or more of the one or more outer loop adaptation processes; and
  to maintain, by the base station, a sliding window of time stamps of the acknowledgement information for each of the one or more outer loop adaptation processes.

23. The apparatus of claim 22,
wherein the acknowledgement information relates to one of the one or more outer loop adaptation processes having a set of characteristics of the one or more characteristics;
wherein the configuration of the at least one processor to update the one or more outer loop adaptation processes includes configuration of the at least one processor to update each of the one or more outer loop adaptation processes having at least one characteristic of the set of characteristics associated with the one of the one or more outer loop adaptation processes.

24. The apparatus of claim 22, further including configuration of the at least one processor:
  to select, by the base station, one or more timely outer loop adaptation processes from the one or more outer loop adaptation processes, wherein the one or more timely outer loop adaptation processes have a number of timely updates exceeding a threshold minimum number of timely updates;
  to identify, by the base station, the one or more characteristics associated with the each TTI, wherein the configuration of the at least one processor to compute the one or more CQI back-offs includes configuration to compute the one or more CQI back-offs using a timely outer loop adaptation process of the one or more timely outer loop adaptation processes having a highest number of characteristics of the one or more characteristics associated with the each TTI.

25. The apparatus of claim 24, wherein the configuration of the at least one processor to select the one or more timely outer loop adaptation processes includes configuration of the at least one processor:
  to compare, by the base station, a current time of the selecting the one or more timely outer loop adaptation processes with an oldest time stamp of the sliding window of time stamps for each of the one or more outer loop adaptation processes; and
  to determine, by the base station, the one or more timely outer loop adaptation processes when the current time is within a predetermined time of the oldest time stamp.

26. The apparatus of claim 20, wherein the base station is one of a plurality of base stations in a coordinated multipoint (CoMP) cooperation set.

* * * * *